(12) United States Patent  
Matsuoka

(10) Patent No.: US 12,384,255 B2
(45) Date of Patent: Aug. 12, 2025

(54) ELECTRIC COMPETITION VEHICLE AND METHOD FOR CONTROLLING THE SAME

(71) Applicant: YAMAHA HATSUDOKI KABUSHIKI KAISHA, Iwata (JP)

(72) Inventor: Yoshinori Matsuoka, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 184 days.

(21) Appl. No.: 18/353,349

(22) Filed: Jul. 17, 2023

(65) Prior Publication Data

US 2024/0083260 A1 Mar. 14, 2024

(30) Foreign Application Priority Data

Sep. 13, 2022 (JP) .................................. 2022-145509

(51) Int. Cl.
*B60L 15/20* (2006.01)
*B60L 58/10* (2019.01)
*H02J 7/00* (2006.01)

(52) U.S. Cl.
CPC ............... *B60L 15/20* (2013.01); *B60L 58/10* (2019.02); *H02J 7/0048* (2020.01); *B60L 2200/12* (2013.01); *B60L 2240/12* (2013.01); *B60L 2240/14* (2013.01); *B60L 2240/42* (2013.01)

(58) Field of Classification Search
CPC ...... B60L 15/20; B60L 58/10; B60L 2200/12; B60L 2240/12; B60L 2240/14; B60L 2240/42; B60L 15/2045; B60L 2260/52; B60L 2260/54; B60L 15/30; B60L 15/10; H02J 7/0048

See application file for complete search history.

(56) References Cited

U.S. PATENT DOCUMENTS

| 5,627,752 | A | 5/1997 | Buck et al. |
| 2008/0071436 | A1* | 3/2008 | Dube ........................ B62M 6/50 701/22 |
| 2019/0278281 | A1* | 9/2019 | Sakai ................... G07C 5/0816 |
| 2020/0189562 | A1 | 6/2020 | Noack |

FOREIGN PATENT DOCUMENTS

| JP | 2010274687 A | 12/2010 |
| JP | 2013075561 A | 4/2013 |

* cited by examiner

*Primary Examiner* — Rodney A Butler
(74) *Attorney, Agent, or Firm* — Rabin & Berdo, P.C.

(57) ABSTRACT

An electric vehicle for a race, including a drive wheel, an electric motor linked to the drive wheel, a battery that supplies power to the electric motor, a remaining battery level detection unit that detects a remaining level of the battery, a control unit that controls the electric motor, and a throttle operator that is connected to the control unit and is operated by a rider when the rider adjusts an output of the electric motor. The control unit includes a motor control section that controls the output of the electric motor based on an amount of operation of the throttle operator, a power consumption rate calculation section that calculates a power consumption rate of the electric motor after a start of the race, and a travelable time estimation section that estimates a travelable time based on the remaining level and the power consumption rate.

12 Claims, 5 Drawing Sheets

ELECTRIC COMPETITION VEHICLE AND METHOD FOR CONTROLLING THE SAME

CROSS REFERENCE TO RELATED APPLICATIONS

This application claims the benefit of priority to Japanese Patent Application No. 2022-145509 filed on Sep. 13, 2022. The entire contents of this application are incorporated herein by reference.

BACKGROUND OF THE INVENTION

Field of the Invention

The present invention relates to an electric competition vehicle and a method for controlling the same.

Description of the Related Art

Electric vehicles have been known in the art that have an electric motor as a driving source for driving and control the electric motor so that the remaining battery level does not become zero before reaching the destination. For example, JP 2010-274687A discloses such an electric vehicle. JP 2010-274687A describes a control method for controlling an electric motor so as to calculate the remaining battery level and the amount of power consumption to the destination so that it is possible to reach the destination before the remaining battery level becomes zero.

Also known are electric competition vehicles that use an electric motor as a driving source for traveling. For example, motocrossers including electric motors, or the like, have been known in the art. Races are known in which rankings are determined by the distance traveled in a predetermined regulation travel time or by taking into consideration the distance traveled in the regulation travel time.

SUMMARY OF THE INVENTION

Technical Problem

In such a race as described above, if the remaining battery level becomes zero before the elapse of the regulation travel time, the rider may not be able to continue driving until the end of the regulation travel time and may be disqualified. In order to avoid such a problem, there may be situations where the rider needs to refrain from accelerating. The rider may become concerned about the remaining battery level in the latter half of the race and may not be able to purely enjoy the race.

The present invention has been made in view of the above, and an object thereof is to provide an electric competition vehicle, with which it is possible to prevent the remaining battery charge from inadvertently becoming zero while in a race so that the rider is more likely to be able to enjoy the race.

Solution to Problem

An electric competition vehicle disclosed herein includes: a drive wheel; an electric motor linked to the drive wheel; a battery that supplies power to the electric motor; a remaining battery level detection unit that detects a remaining level of the battery; a control unit that controls the electric motor; and a throttle operator that is connected to the control unit and is operated by the rider when the rider adjusts an output of the electric motor. The control unit includes: a motor control section that controls the output of the electric motor based on an amount of operation of the throttle operator; a power consumption rate calculation section that calculates a power consumption rate of the electric motor after a start of a race; and a travelable time estimation section that estimates a travelable time based on the remaining level of the battery and a power consumption rate of the electric motor.

With the electric competition vehicle described above, the subsequent travelable time is estimated based on the remaining level of the battery and the power consumption rate of the electric motor after the start of the race. For example, the rider can adjust the power consumption of the electric motor thereafter in the race based on the estimated travelable time. This prevents the remaining battery level from inadvertently becoming zero during the race. The rider can enjoy the race without worrying about the remaining battery level.

The control unit may include: a travel time input section on which an estimated travel time is input; an elapsed time measuring section that measures an elapsed time since the start of the race; a remaining time calculation section that calculates a remaining time by subtracting the elapsed time from the estimated travel time; and an output limit section that determines whether the travelable time estimated by the travelable time estimation section is less than the remaining time, and limits the output of the electric motor when the travelable time is less than the remaining time.

Then, when the estimated travelable time becomes less than the remaining time of the race, the output of the electric motor is limited automatically. This prevents the remaining battery level from inadvertently becoming zero during the race. The rider can enjoy the race without worrying about the remaining battery level.

The output limit section may limit the output of the electric motor so that speed or acceleration of the electric competition vehicle does not exceed a predetermined threshold value when the travelable time is less than the remaining time.

By suppressing the peak value of the speed or acceleration, the remaining level can be secured. This prevents the remaining battery level from inadvertently becoming zero during the race.

The output limit section may limit the output of electric motor so that the output of the electric motor is decreased by a predetermined percentage when the travelable time is less than the remaining time and the amount of operation of the throttle operator increases.

Then, by suppressing the degree of acceleration by a predetermined percentage when the throttle operator is operated so as to accelerate, the remaining battery level can be secured. This prevents the remaining battery level from inadvertently becoming zero during the race.

The output limit section may limit the output of the electric motor so that the travelable time is equal to or greater than the remaining time.

This prevents the remaining battery level from inadvertently becoming zero during the race. The electric competition vehicle can continue running for a predetermined estimated travel time.

The electric competition vehicle may include an input unit on which an operation to cancel the output limitation of the electric motor is input. The control unit may include a limitation cancel section that cancels the output limitation of the electric motor by the output limit section when the operation is input on the input unit.

Although this limits the output of the electric motor so that the remaining battery level does not become zero, the output limitation can be canceled as intended by the rider, whereby the rider can temporarily accelerate or drive at high speed as intended. Thus, the rider can enjoy the race more.

The control unit may include a notification section that notifies the rider of the travelable time.

Then, the rider can race while keeping track of the travelable time.

The electric competition vehicle may be a motocrosser.

A method for controlling an electric competition vehicle disclosed herein is a method for controlling an electric competition vehicle including: a drive wheel; an electric motor linked to the drive wheel; a battery that supplies power to the electric motor; a throttle operator that is operated by a rider when the rider adjusts an output of the electric motor. The control method includes: a remaining battery level detection step of detecting a remaining level of the battery; a power consumption rate calculation step of calculating a power consumption rate of the electric motor after a start of a race; a travelable time estimation step of estimating a travelable time based on the remaining level of the battery and the power consumption rate of the electric motor; and a motor control step of controlling the output of the electric motor based on an amount of operation of the throttle operator. The output of the electric motor is limited in the motor control step based on the travelable time estimated in the travelable time estimation step.

The method for controlling the electric competition vehicle may include: a travel time input step in which an estimated travel time is input; an elapsed time measuring step of estimating an elapsed time since the start of the race; and a remaining time calculation step of calculating a remaining time by subtracting the elapsed time from the estimated travel time. In the motor control step, it may be determined whether the travelable time is less than the remaining time, and the output of the electric motor may be limited when the travelable time is less than the remaining time.

In the motor control step, the output of the electric motor may be limited so that speed or acceleration of the electric competition vehicle does not exceed a predetermined threshold value when the travelable time is less than the remaining time.

In the motor control step, the output of the electric motor may be limited so that the output of the electric motor is decreased by a predetermined percentage when the travelable time is less than the remaining time and the amount of operation of the throttle operator increases.

In the motor control step, the output of the electric motor is limited so that the travelable time is equal to or greater than the remaining time.

The electric competition vehicle may include an input unit on which an operation to cancel the output limitation of the electric motor is input. The method for controlling the electric competition vehicle may be configured so that the limitation of the output of the electric motor in the motor control step is canceled when the operation is input on the input unit.

Advantageous Effects of Invention

According to the present invention, it is possible to provide an electric competition vehicle, with which it is possible to prevent the remaining battery level from inadvertently becoming zero while in a race so that the rider is more likely to be able to enjoy the race.

DETAILED DESCRIPTION OF THE PREFERRED EMBODIMENTS

Figure 1:
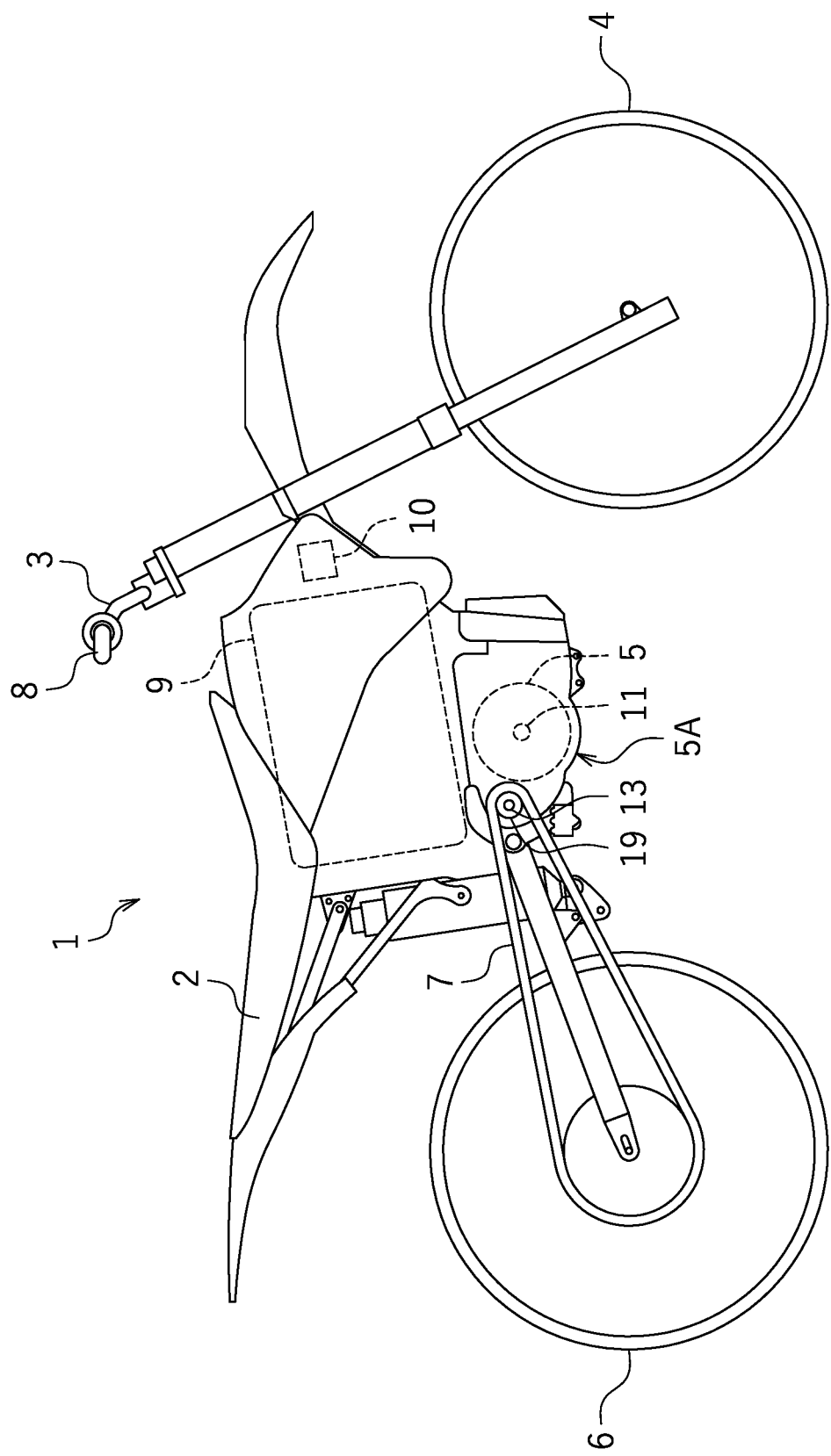
FIG. 1 is a side view of a motocrosser according to an embodiment.

An embodiment of the electric competition vehicle will now be described with reference to the drawings. As shown in FIG. 1, the electric competition vehicle according to the present embodiment is a motocrosser 1.

The motocrosser 1 includes a seat 2, a handle 3, a throttle grip 8, a power unit 5A having an electric motor 5, a battery 9, a front wheel 4, a rear wheel 6, a chain 7, and a control unit 10. The throttle grip 8 is an example of the operator that is operated by the rider when the rider adjusts the output of the electric motor 5. The throttle grip 8 is provided on the handle 3. The rear wheel 6 is a drive wheel that is driven by the power of the electric motor 5. The chain 7 is an example of the power transmission member that transmits the power of the electric motor 5 to the rear wheel 6. The power unit 5A includes an output shaft 13 that outputs power. Although not shown in the figure, the motor shaft 11 of the electric motor 5 and the output shaft 13 are linked together by a plurality of gears. A sprocket 19 is fixed to the output shaft 13, and the chain 7 is wound around the sprocket 19.

Figure 2:
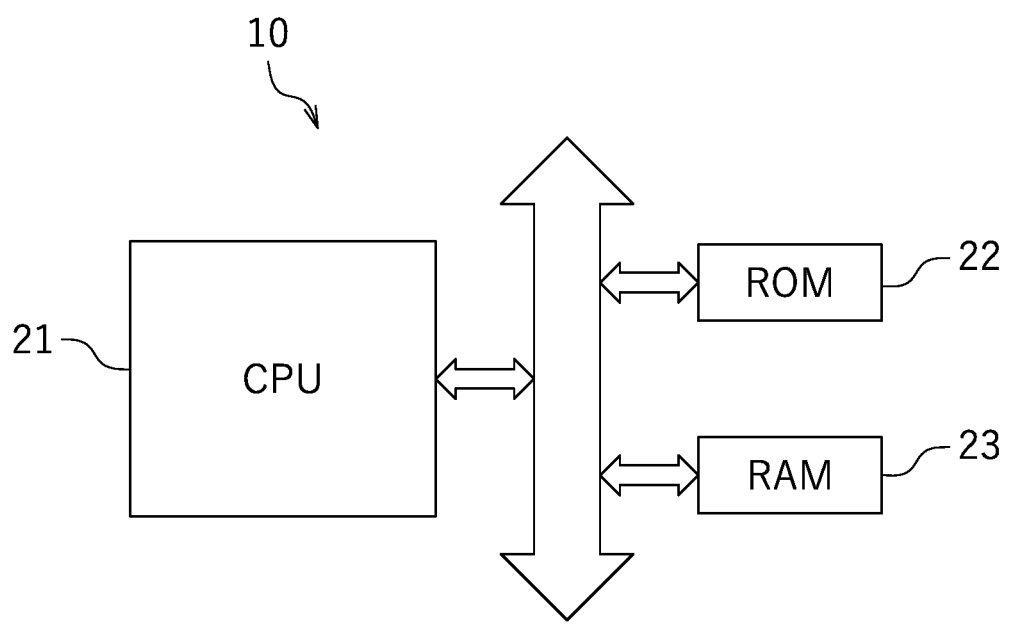
FIG. 2 is a diagram showing a configuration of a control unit.
Figure 3:
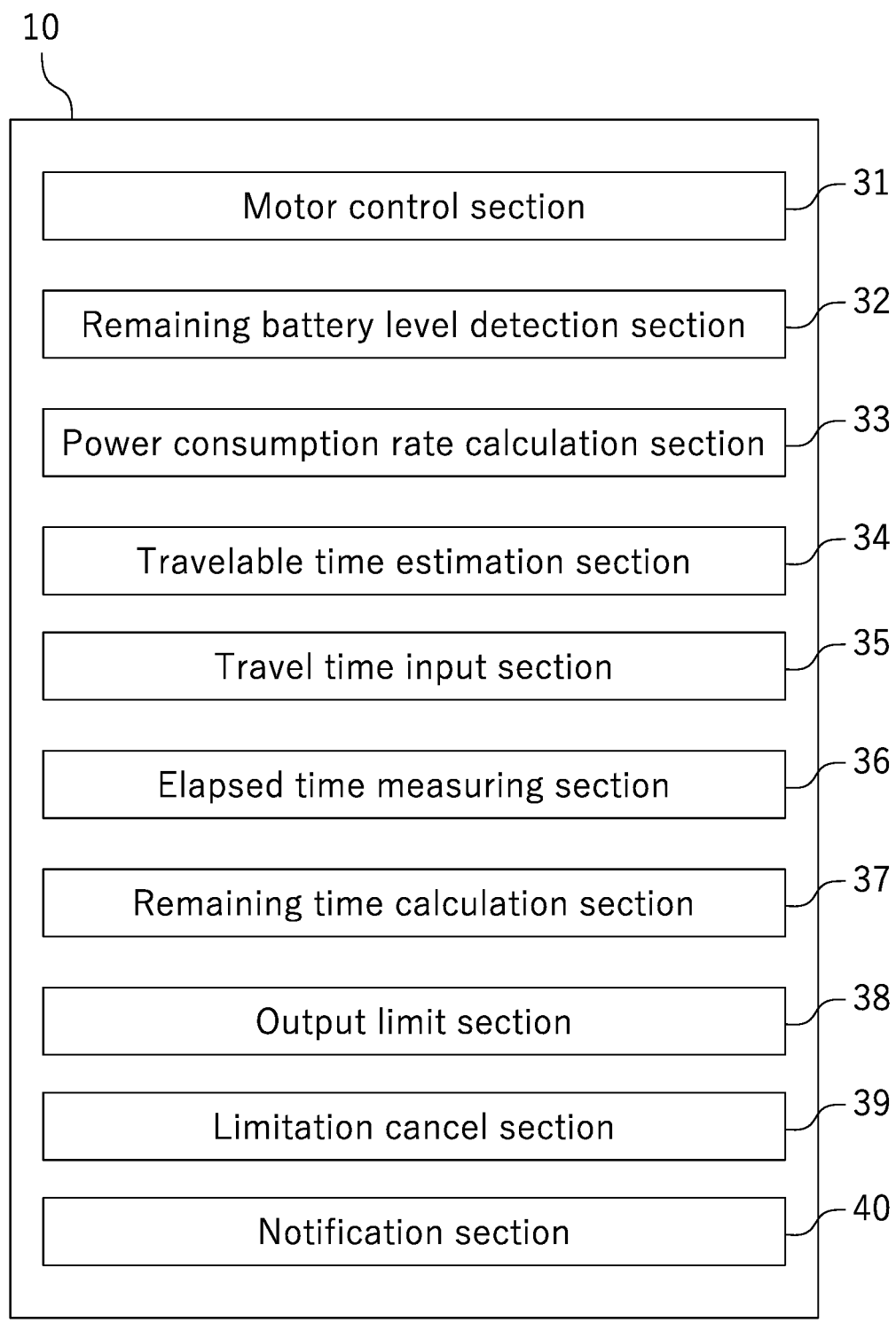
FIG. 3 is a functional block diagram of the control unit.

As shown in FIG. 2, the control unit 10 is composed of a computer, and includes a CPU 21, a ROM 22 and a RAM 23. FIG. 3 is a functional block diagram of the control unit 10. As the CPU 21 executes a computer program, the control unit 10 functions as a motor control section 31, a remaining battery level detection section 32, a power consumption rate calculation section 33, a travelable time estimation section 34, a travel time input section 35, an elapsed time measuring section 36, a remaining time calculation section 37, an output limit section 38, a limitation cancel section 39, and a notification section 40.

The control unit 10 is connected to the throttle grip 8. The motor control section 31 controls the output of the electric motor 5 based on the amount by which the throttle grip 8 is operated by the rider. As the amount of operation of the throttle grip 8 increases, the motor control section 31 increases the output of the electric motor 5. Thus, the motocrosser 1 accelerates. As the amount of operation of the throttle grip 8 decreases, the motor control section 31 decreases the output of the electric motor 5. Thus, the motocrosser 1 decreases its acceleration or decelerates.

The electric motor 5 is driven by the power stored in the battery 9. As the motocrosser 1 race progresses, the remaining level of the battery 9 decreases gradually. The remaining battery level detection section 32 detects the remaining level of the battery 9. In the present embodiment, the control unit 10 is configured to detect the remaining level of the battery 9, and the remaining battery level detection section 32 functions as the remaining battery level detection unit. The remaining battery level detection unit is integrated with the control unit 10.

The power consumption rate calculation section 33 calculates the power consumption rate of the electric motor 5 after the start of the race. Here, the power consumption rate calculation section 33 calculates the average power consumption rate of the electric motor 5 after the start of the race. For example, the power consumption rate calculation section 33 calculates the average power consumption rate Q/T by dividing the power consumption Q of the electric motor 5 from the start of the race to the present point in time by time T from the start of the race to the present point in time. Note that the power consumption rate calculated by the power consumption rate calculation section 33 is not limited to the average power consumption rate.

The power consumption rate of the electric motor 5 depends on the racetrack where the race of the motocrosser 1 takes place and the weather there, and how the rider drives. However, based on the power consumption rate of the electric motor 5 after the start of the race, it is possible to relatively accurately estimate the travelable time, which depends on the racetrack, the weather and how the rider drives. The travelable time estimation section 34 estimates the travelable time based on the remaining level of the battery 9 and the power consumption rate of the electric motor 5 of after the start of the race. For example, the travelable time estimation section 34 calculates the travelable time by dividing the remaining level of the battery 9 by the power consumption rate.

Figure 4:
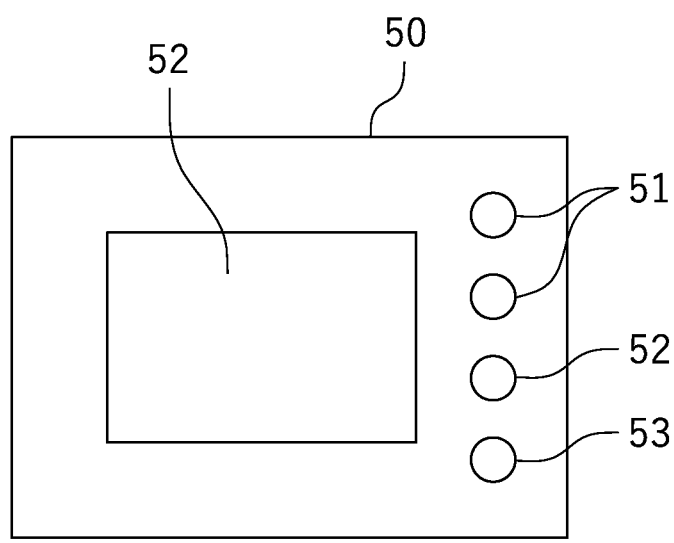
FIG. 4 is a diagram illustrating a meter unit provided in the motocrosser.

With the motocrosser 1 according to the present embodiment, the rider can input an estimated travel time. For example, as shown in FIG. 4, the motocrosser 1 may include a meter unit 50 having a push button-type switch 51 and a display panel 52. The rider can input an estimated travel time by operating the switch 51 before the race starts. For example, the estimated travel time is displayed on the display panel 52. Note that a display panel 52 may be a touch panel. In such a case, the rider can input an estimated travel time by pressing the display panel 52. Information of the estimated travel time input by the rider is input to the travel time input section 35.

The elapsed time measuring section 36 measures the elapsed time since the start of the race. For example, the elapsed time measuring section 36 starts measuring the elapsed time as the rider presses a start button 52 (see FIG. 4) at the start of the race.

The remaining time calculation section 37 calculates the remaining time by subtracting the elapsed time from the estimated travel time. The calculated remaining time is displayed on the display panel 52. Note however that the remaining time does not need to be displayed. The display panel 52 may be optional.

When the travelable time is less than the remaining time, there is concern that the remaining level of the battery 9 may become zero during the race. In such a case, it is preferred to limit the output of the electric motor 5 so that the motocrosser 1 can continue running until the end of the race. The output limit section 38 determines whether the travelable time is less than the remaining time, and limits the output of the electric motor 5 when the travelable time is less than the remaining time. When the output of the electric motor 5 is limited, for example, acceleration of the motocrosser 1 is suppressed even if the rider opens the throttle grip 8 wide.

Although there is no particular limitation on the method of limiting the output of the electric motor 5, it is preferred that the output limit section 38 limits the output of the electric motor 5 so that the travelable time is equal to or greater than the remaining time. This allows the motocrosser 1 to continue running for the estimated travel time. The output limit section 38 may, for example, limits the output of the electric motor 5 so that the speed or acceleration of the motocrosser 1 does not exceed a predetermined threshold value. The output limit section 38 may limit the output of the electric motor 5 so that the output of the electric motor 5 is decreased by a predetermined percentage when the amount of operation of the throttle grip 8 increases. For example, the output limit section 38 may reduce the output of the electric motor 5 by 10% when the rider increases the amount of operation of the throttle grip 8 in an attempt to accelerate.

It is desirable that the motocrosser 1 be able to continue running until the end of the race, but the rider will no longer be able to enjoy the race if the output of the electric motor 5 is uniformly limited regardless of the intention of the rider. Therefore, it is preferred that the output limitation can be canceled as intended by the rider. In the present embodiment, the motocrosser 1 includes an input unit on which an operation by the rider to cancel the output limitation of the electric motor 5 is input. For example, a cancel button 53 (see FIG. 4) may be provided as such an input unit. Note however that there is no limitation on the configuration of the input unit. When the operation is input to the input unit, the limitation cancel section 39 cancels the output limitation of the electric motor 5 by the output limit section 38.

The notification section 40 notifies the rider of the travelable time. For example, the notification section 40 notifies the rider of the travelable time by displaying the travelable time on the display panel 52. Note however that the method of notification is not limited to display. For example, the notification section 40 may notify the travelable time via audio.

Figure 5:
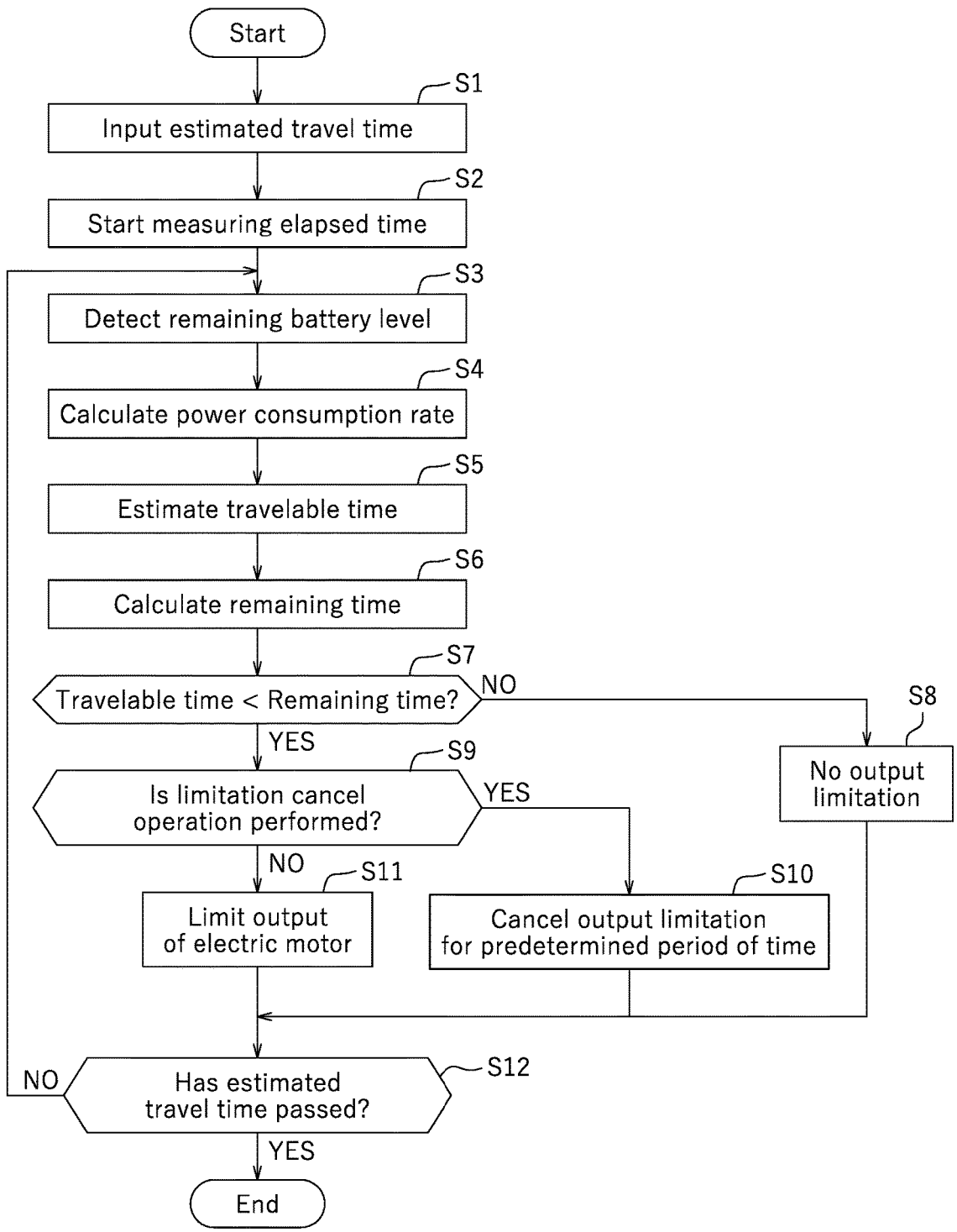
FIG. 5 is a flow chart of a method for controlling the motocrosser.

Next, an example of a method for controlling the motocrosser 1 will be described with reference to the flow chart of FIG. 5. The following control is performed by the control unit 10.

First, prior to the start of the race, the rider inputs an estimated travel time in step S1. The rider inputs, for example, a predetermined regulation travel time of the race (hereinafter referred to as the competition time) as the estimated travel time. When the rider presses the start button 52 at the start of the race, the elapsed time measuring section 36 starts measuring the elapsed time in step S2. In step S3, the remaining battery level detection section 32 detects the remaining level of the battery 9. In step S4, the power consumption rate calculation section 33 calculates the power consumption rate of the electric motor 5 after the start of the race. Note that there is no particular limitation on the order between step S3 and step S4. Step S4 may be performed before or after step S3, or may be performed at the same time as step S3.

Next, the process proceeds to step S5, in which the travelable time estimation section 34 estimates the travelable time. In step S6, the remaining time calculation section 37 calculates the competition remaining time. Note that there is no particular limitation on the order between step S5 and step S6. Then, in step S7, it is determined whether the travelable time is less than the remaining time. If the determination result from step S7 is NO, the output of the electric motor 5 is not limited (step S8). On the other hand, if the determination result from step S7 is YES, the process proceeds to step S9.

In step S9, it is determined whether the operation of cancelling the output limitation is performed by the rider. If the cancel operation is performed, the process proceeds to step S10, whereas if the cancel operation is not performed, the process proceeds to step S11.

In the present embodiment, when the rider performs a cancel operation, the output limitation is canceled for a predetermined period of time. As the process proceeds to step S10, the output limitation of the electric motor 5 is canceled for a predetermined period of time. That is, for a predetermined period of time, the electric motor 5 outputs a driving force in accordance with the amount of operation of the throttle grip 8 by the rider.

In step S11, the output limit section 38 limits the output of the electric motor 5. The electric motor 5 outputs a driving force that is smaller than the driving force in accordance with the amount of operation of the throttle grip 8 by the rider. Thus, the power consumption of the battery 9 is suppressed while the output is limited.

In step S12, it is determined whether the estimated travel time has elapsed. When it is determined that the estimated travel time has elapsed, this control ends. When it is determined that the estimated travel time has not elapsed, the process returns to step S3 and repeats the processes of step S3 and subsequent steps.

Next, the various effects brought about by the present embodiment will be described.

With the motocrosser 1 according to the present embodiment, the subsequent travelable time is estimated based on the remaining level of the battery 9 and the power consumption rate of the electric motor 5 after the start of the race. If the travelable time is less than the remaining time of the race, the output of the electric motor 5 is limited. This prevents the remaining level of the battery 9 from inadvertently becoming zero during the race. Thus, the rider can enjoy the race without worrying about the remaining level of the battery 9.

According to the present embodiment, the output limit section 38 of the control unit 10 applies a limit to the output of the electric motor 5 so that the travelable time becomes equal to or greater than the remaining time. This prevents the remaining level of the battery 9 from inadvertently becoming zero during the race. The motocrosser 1 can continue running for the predetermined competition time.

The output limit section 38 of the control unit 10 applies a limit to the output of the electric motor 5 so that, for example, the speed or acceleration of the motocrosser 1 does not exceed a predetermined threshold value when the travelable time is less than the remaining time. By suppressing the peak value of the speed or acceleration, the remaining level of the battery 9 can be secured.

The output limit section 38 of the control unit 10 may apply a limit to the output of the electric motor 5 so that the output of the electric motor 5 is decreased by a predetermined percentage when the travelable time is less than the remaining time and the amount of operation of the throttle grip 8 increases. By thus suppressing the degree of acceleration by a predetermined percentage, the remaining level of the battery 9 can be secured.

Depending on the development of the race, the rider may wish to accelerate rapidly or continue driving at high speed even if there is a possibility that the remaining level of the battery 9 may become zero during the race. In such cases, if the output of the electric motor 5 is limited regardless of the intention of the rider, the rider may not be able to fully enjoy the race. According to the present embodiment, however, when the rider presses the cancel button 53, the output limitation of the electric motor 5 by the output limit section 38 is canceled for a predetermined period of time. Since the output limitation can be canceled as intended by the rider, the rider is temporarily allowed to accelerate or drive at high speed as intended. Thus, the rider can fully enjoy the race.

The motocrosser 1 according to the present embodiment includes a notification section 40 that notifies the rider of the travelable time. Thus, the rider can compete while keeping track of the travelable time. The rider can adjust the vehicle maneuver by himself/herself so that the remaining level of the battery 9 does not become zero during the race.

While one embodiment has been described above, the embodiment is merely an example. Various other embodiments are possible.

While the control unit 10 serves also as a remaining battery level detection unit in the embodiment described above, the remaining battery level detection unit may be separate from the control unit 10. For example, the remaining battery level detection unit may be built into the battery 9.

Even if the control unit 10 does not limit the output of the electric motor 5, as long as the rider is able to know the travelable time, the rider can adjust the vehicle maneuver by himself/herself so that the remaining level of the battery 9 does not become zero during the race. If the rider adjusts the vehicle maneuver by himself/herself so that the remaining level of the battery 9 does not become zero, the controller 10 does not have to limit the output of the electric motor 5. The travel time input section 35, the elapsed time measuring section 36, the remaining time calculation section 37 and the output limit section 38 may be optional.

The output limitation of the electric motor 5 by the controller 10 may not be able to be cancelled by the rider. The input unit (the cancel button 53 in the embodiment described above), on which an operation to cancel the output limitation is input, and the limitation cancel section 39 may be optional.

Notification to the rider of the travelable time may not be necessary. The control unit 10 may not include the notification section 40.

In the embodiment described above, the motocrosser 1 has been described as an example of the electric competition vehicle. Races in which off-road competition vehicles such as the motocrosser 1 participate have a greater difference in load due to course layout and road surface conditions than races in which on-road competition vehicles participate. Therefore, it is very difficult for the rider himself/herself to judge whether the remaining level of the battery 9 will become zero in the middle of the race. Therefore, the effect of limiting the output of the electric motor 5 so that the remaining level of the battery 9 does not become zero is particularly pronounced. Note however that the electric competition vehicle is not limited to the motocrosser 1. The electric competition vehicle may be a motorcycle other than the motocrosser 1. The electric competition vehicle may be a straddled vehicle other than a motorcycle. Note that a straddled vehicle refers to a vehicle that is straddled by the rider. A straddled vehicle is not limited to a motorcycle. A straddled vehicle may be, for example, an auto tricycle, an ATV (All Terrain Vehicle), or a snowmobile.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

REFERENCE SIGNS LIST

1: Motocrosser (electric competition vehicle), 5: Electric motor, 6: Rear wheel (drive wheel), 8: Throttle grip (throttle operator), 9: Battery, 10: Control unit, 31: Motor control section, 32: Remaining battery level detection section, 33: Power consumption rate calculation section, 34: Travelable time estimation section, 35: Travel time input section, 36: Elapsed time measuring section, 37: Remaining time calculation section, 38: Output limit section, 39: Limitation cancel section, 40: Notification section, 53: Cancel button (input unit)

What is claimed is:
1. An electric vehicle for a race, comprising:
a drive wheel;
an electric motor linked to the drive wheel;
a battery that supplies power to the electric motor;
a remaining battery level detection unit that detects a remaining level of the battery;
a control unit that controls the electric motor; and
a throttle operator that is connected to the control unit and is operated by a rider of the electric vehicle when the rider adjusts an output of the electric motor,
wherein the control unit includes:
    a motor control section that controls the output of the electric motor based on an amount of operation of the throttle operator;
    a power consumption rate calculation section that calculates a power consumption rate of the electric motor after a start of the race;
    a travelable time estimation section that estimates a travelable time based on the remaining level of the battery and the power consumption rate of the electric motor;
    a travel time input section through which an estimated travel time is input;
    an elapsed time measuring section that measures an elapsed time since the start of the race;
    a remaining time calculation section that calculates a remaining time by subtracting the elapsed time from the estimated travel time; and
    an output limit section that determines whether the travelable time estimated by the travelable time estimation section is less than the remaining time, and limits the output of the electric motor when the travelable time is less than the remaining time.
2. The electric vehicle according to claim 1, wherein the output limit section is configured to limit the output of the electric motor so that a speed or an acceleration of the electric vehicle does not exceed a predetermined threshold value when the travelable time is less than the remaining time.

3. The electric vehicle according to claim 1, wherein the output limit section is configured to limit the output of electric motor so that the output of the electric motor is decreased by a predetermined percentage when the travelable time is less than the remaining time and the amount of operation of the throttle operator increases.
4. The electric vehicle according to claim 1, wherein the output limit section is configured to limit the output of the electric motor so that the travelable time is equal to or greater than the remaining time.
5. The electric vehicle according to claim 1, further comprising:
    an input unit through which an operation to cancel the output limitation of the electric motor is input,
    wherein the control unit further includes a limitation cancel section that cancels the output limitation of the electric motor by the output limit section when the operation to cancel the output limitation is received through the input unit.
6. An electric vehicle for a race, comprising:
a drive wheel;
an electric motor linked to the drive wheel;
a battery that supplies power to the electric motor;
a remaining battery level detection unit that detects a remaining level of the battery;
a control unit that controls the electric motor; and
a throttle operator that is connected to the control unit and is operated by a rider of the electric vehicle when the rider adjusts an output of the electric motor,
wherein the control unit includes:
    a motor control section that controls the output of the electric motor based on an amount of operation of the throttle operator,
    a power consumption rate calculation section that calculates a power consumption rate of the electric motor after a start of the race,
    a travelable time estimation section that estimates a travelable time based on the remaining level of the battery and the power consumption rate of the electric motor, and
    a notification section that notifies the rider of the travelable time.
7. An electric vehicle for a race, comprising:
a drive wheel;
an electric motor linked to the drive wheel;
a battery that supplies power to the electric motor;
a remaining battery level detection unit that detects a remaining level of the battery;
a control unit that controls the electric motor; and
a throttle operator that is connected to the control unit and is operated by a rider of the electric vehicle when the rider adjusts an output of the electric motor,
wherein the control unit includes:
    a motor control section that controls the output of the electric motor based on an amount of operation of the throttle operator,
    a power consumption rate calculation section that calculates a power consumption rate of the electric motor after a start of the race, and
    a travelable time estimation section that estimates a travelable time based on the remaining level of the battery and the power consumption rate of the electric motor; and
wherein the electric vehicle is a motocrosser.

8. A method for controlling an electric vehicle for a race, the electric vehicle including:
- a drive wheel;
- an electric motor linked to the drive wheel;
- a battery that supplies power to the electric motor; and
- a throttle operator that is operated by a rider of the electric vehicle when the rider adjusts an output of the electric motor, the method comprising:
- a remaining battery level detection step of detecting a remaining level of the battery;
- a power consumption rate calculation step of calculating a power consumption rate of the electric motor after a start of the race;
- a travelable time estimation step of estimating a travelable time based on the remaining level of the battery and the power consumption rate of the electric motor;
- a motor control step of controlling the output of the electric motor based on an amount of operation of the throttle operator,
- a travel time input step in which an estimated travel time is received;
- an elapsed time measuring step of estimating an elapsed time since the start of the race; and
- a remaining time calculation step of calculating a remaining time by subtracting the elapsed time from the estimated travel time, wherein the motor control step further includes
determining whether the travelable time is less than the remaining time, and
limiting the output of the electric motor upon detecting that the travelable time is less than the remaining time; and
wherein the output of the electric motor is limited in the motor control step based on the travelable time estimated in the travelable time estimation step.

9. The method for controlling the electric vehicle according to claim 8, wherein limiting the output of the electric motor includes limiting the output of the electric motor so that a speed or an acceleration of the electric vehicle does not exceed a predetermined threshold value when the travelable time is less than the remaining time.

10. The method for controlling the electric vehicle according to claim 8, wherein limiting the output of the electric motor includes decreasing the output of the electric motor by a predetermined percentage when the travelable time is less than the remaining time and the amount of operation of the throttle operator increases.

11. The method for controlling the electric vehicle according to claim 8, wherein limiting the output of the electric motor includes limiting the output of the electric motor so that the travelable time is equal to or greater than the remaining time.

12. The method for controlling the electric vehicle according to claim 8, wherein:
- the electric vehicle further includes an input unit through which an operation to cancel the output limitation of the electric motor is received; and
- the limitation of the output of the electric motor in the motor control step is canceled when the operation is received through the input unit.

\* \* \* \* \*